(No Model.)
T. HAND.
NUT LOCK.
No. 571,661. Patented Nov. 17, 1896.
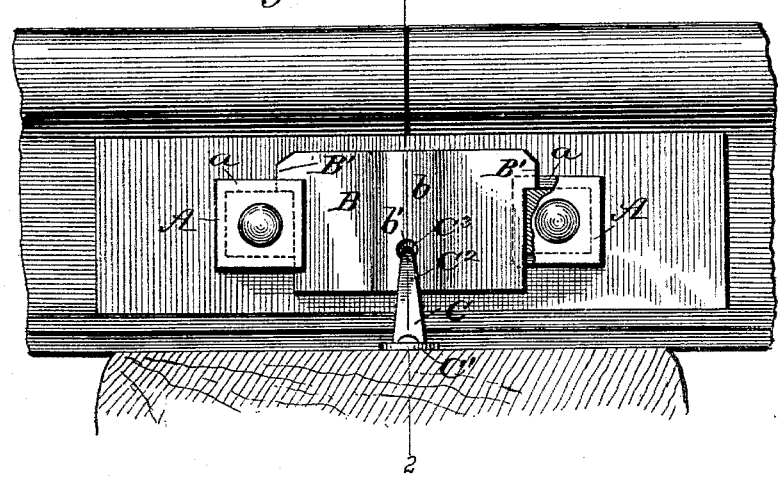
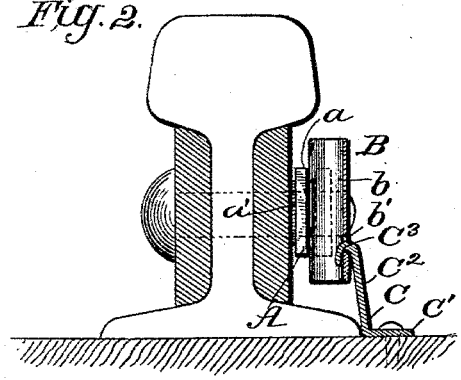
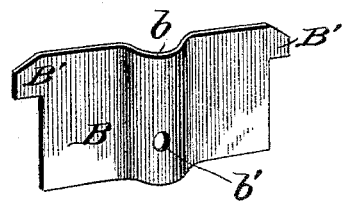
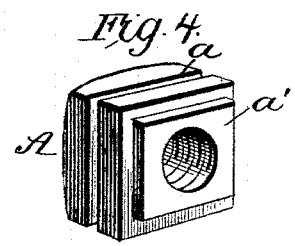
WITNESSES:
Jos. A. Ryan
P. B. Turpin
INVENTOR
Townson Hand,
BY Munn & Co.
ATTORNEYS.
THE NORRIS PETERS CO., PHOTO-LITHO., WASHINGTON, D. C.

UNITED STATES PATENT OFFICE.

TOWNSON HAND, OF NORTH VERNON, INDIANA, ASSIGNOR OF TWO-FIFTHS TO MOSES ALEXANDER AND JOHN C. COPE, OF SAME PLACE.

NUT-LOCK.

SPECIFICATION forming part of Letters Patent No. 571,661, dated November 17, 1896.

Application filed April 8, 1896. Serial No. 586,726. (No model.)

*To all whom it may concern:*

Be it known that I, TOWNSON HAND, of North Vernon, in the county of Jennings and State of Indiana, have invented a new and useful Improvement in Nut-Locks, of which the following is a specification.

This invention is an improvement in nut-locks, seeking to provide a simple, cheap, and easily applied construction by which to securely lock the nuts of rail-joints, of bridges, vehicles, and other constructions where it is desired to securely lock a nut or nuts from turning.

The invention consists in certain novel constructions, combinations, and arrangements of parts, as will be hereinafter described, and pointed out in the claims.

In the drawings, Figure 1 is a face view of my improvements applied to a fish-plate. Fig. 2 is a cross-sectional view thereof on about line 2 2 of Fig. 1. Fig. 3 is a detail view of the locking-plate, and Fig. 4 is a detail view of the nut.

In the construction shown the nut A is provided with a seat or seats for the locking-plate. By preference this seat is secured by forming a groove around the edge of the nut having the angular sections $a$, and by preference I form corresponding angular sections $a'$ at the inner end of the nut, producing an angular tenon-like projection on the inner end of the nut, as best shown in Fig. 4. It is preferred to make these bearings by both a groove in the edge of the nut and a tenon at the inner end thereof, as thereby the locking-plate may be applied flat against the fish-plate when no obstruction exists to such arrangement, and in case of such obstruction the locking-plate may be slipped in the groove formed in the edge of the nut. The locking-plate has a crimp or bulged portion $b$, which has a double function. In the first place, it permits of the lengthening of the locking-plate by hammering such portion out entirely or to any desired extent to secure the proper adjustment of the locking-plate, and it also leaves space facilitating the introduction of the hook on the anchor-plate when the locking-plate is used flat against the fish-plate. This locking-plate B fits at its ends in the bearings or seats $a$ or $a'$ of the nuts and has at its upper edge projecting head portions $B'$, which overlap the adjacent nuts of a fish-plate and hold the locking-plate from moving downward too far. This locking-plate it will be seen from Fig. 1 extends between the adjacent nuts and serves to hold them from turning in either direction as long as the locking-plate is in the position shown in Figs. 1 and 2. The opening $b'$ is adapted to receive a nail or screw when the nuts are turned up against a wooden beam, as sometimes occurs in bridge-building, but when used on metal fish-plates it is preferred to lock the locking-plate in position by means of an anchor C, having a base-plate $C'$, which is spiked to the tie, as shown in Figs. 1 and 2, and an upright portion $C^2$, which is provided with a hook $C^3$, which engages in the opening $b'$ and holds the locking-plate securely in locked position, so that it cannot be disturbed by boys or other meddlers and yet can be readily released by drawing the spike which holds the anchor-plate to the tie.

By the bulged construction of locking-plate shown in Figs. 1 and 2 the same plate may be made to serve in locking-nuts set slightly different distances apart whether such different arrangements of the nuts result from a creeping of the rails or different locations of the bolts or otherwise.

It will be understood that if the locking-plate should be loose in the groove $a$ at any time, either from wear or otherwise, the nut can be tapped by a hammer to compress the walls of the groove and cause them to properly bind the locking-plate.

Having thus described my invention, what I claim, and desire to secure by Letters Patent, is—

1. The nut-lock herein described comprising the nuts spaced apart and provided with edge grooves having base-walls forming seats for the locking-plate and with end tenons also forming seats for said plate, the locking-plate fitted to said seats and adapted to extend between the adjacent nuts and provided at its middle with a bulged portion having an opening for the hook of the anchor and the anchor having a base-plate adapted to be spiked to the ties and an upwardly-extending portion adapted to engage in the opening of the locking-plate substantially as shown and described.

2. The combination of the nuts the plate arranged at its ends to hold the same from turning and provided at its middle with an outwardly-projecting portion extending up and down across said plate and having an opening the anchor-plate having a hook engaging in said opening and means for securing said plate substantially as shown and described.

3. A nut-lock consisting of the anchor having a base-plate and an upwardly-extending portion provided with a hook and the locking-plate adapted at its ends to secure a nut and provided at its middle with a bulged portion whereby the plate may be extended and having in such bulged portion an opening for the hook of the anchor substantially as shown and described.

TOWNSON HAND.

Witnesses:
MOSES ALEXANDER,
P. B. TURPIN.